US010320760B2

(12) United States Patent
Wood et al.

(10) Patent No.: US 10,320,760 B2
(45) Date of Patent: Jun. 11, 2019

(54) METHOD AND SYSTEM FOR MUTATING AND CACHING CONTENT IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 15/089,042

(22) Filed: Apr. 1, 2016

(65) Prior Publication Data
US 2017/0289114 A1 Oct. 5, 2017

(51) Int. Cl.
H04L 29/06 (2006.01)
H04L 9/32 (2006.01)
H04L 29/08 (2006.01)

(52) U.S. Cl.
CPC ........ *H04L 63/0471* (2013.01); *H04L 9/3236* (2013.01); *H04L 9/3247* (2013.01);
(Continued)

(58) Field of Classification Search
CPC .................................................. H04L 63/0471
(Continued)

(56) References Cited

U.S. PATENT DOCUMENTS 817,441 A 4/1906 Niesz
4,309,569 A 1/1982 Merkle
(Continued)

FOREIGN PATENT DOCUMENTS

CN 103873371 6/2014
DE 1720277 A1 6/1967
(Continued)

OTHER PUBLICATIONS

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
(Continued)

*Primary Examiner* — Khalil Naghdali

(57) ABSTRACT

One embodiment provides a system that facilitates mutating and caching content in a CCN. During operation, the system receives, by an intermediate node, a content object that indicates an encrypted payload, a signature, and a parameter for a group to which the content object belongs, wherein the content object includes a name that is a hierarchically structured variable length identifier which comprises contiguous name components ordered from a most general level to a most specific level. The system re-encrypts the content object based on the encrypted payload and the parameter to obtain a new encrypted payload and a new signature, wherein re-encrypting is not based on a private key or a public key associated with the encrypted payload. The system transmits the re-encrypted content object to a client computing device, thereby allowing the client computing device to decrypt the re-encrypted content object and verify the new signature.

20 Claims, 5 Drawing Sheets

(52) U.S. Cl.
CPC ...... *H04L 63/0435* (2013.01); *H04L 63/0442* (2013.01); *H04L 67/1097* (2013.01); *H04L 67/2842* (2013.01); *H04L 67/327* (2013.01); H04L 2209/60 (2013.01)

(58) Field of Classification Search
USPC ........................................................ 713/154
See application file for complete search history.

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,214,702 A | 5/1993 | Fischer | |
| 5,377,354 A | 12/1994 | Scannell | |
| 5,506,844 A | 4/1996 | Rao | |
| 5,629,370 A | 5/1997 | Freidzon | |
| 5,649,109 A | 7/1997 | Griesmer | |
| 5,845,207 A | 12/1998 | Amin | |
| 5,870,605 A | 2/1999 | Bracho | |
| 6,021,464 A | 2/2000 | Yao | |
| 6,047,331 A * | 4/2000 | Medard | H04L 45/00 709/239 |
| 6,052,683 A | 4/2000 | Irwin | |
| 6,085,320 A | 7/2000 | Kaliski, Jr. | |
| 6,091,724 A | 7/2000 | Chandra | |
| 6,128,623 A | 10/2000 | Mattis | |
| 6,128,627 A | 10/2000 | Mattis | |
| 6,173,364 B1 | 1/2001 | Zenchelsky | |
| 6,182,133 B1 | 1/2001 | Horvitz | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,947 B1 | 4/2002 | Kavner | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,834,272 B1 | 12/2004 | Naor | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 * | 7/2005 | Madruga | H04L 12/1854 370/238 |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 * | 4/2006 | Garcia-Luna-Aceves | H04L 12/18 370/390 |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E * | 10/2006 | Aziz | H04L 12/22 713/150 |
| 7,149,750 B2 | 12/2006 | Chadwick | |
| 7,152,094 B1 | 12/2006 | Jannu | |
| 7,177,646 B2 * | 2/2007 | O'Neill | H04L 45/22 370/328 |
| 7,206,860 B2 | 4/2007 | Murakami | |
| 7,206,861 B1 | 4/2007 | Callon | |
| 7,210,326 B2 | 5/2007 | Kawamoto | |
| 7,233,948 B1 * | 6/2007 | Shamoon | H04N 21/234318 |
| 7,246,159 B2 | 7/2007 | Aggarwal | |
| 7,257,837 B2 | 8/2007 | Xu | |
| 7,287,275 B2 * | 10/2007 | Moskowitz | G06Q 30/0601 726/13 |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,426,696 B1 | 9/2008 | Hwang | |
| 7,430,755 B1 * | 9/2008 | Hughes | H04L 63/0823 726/3 |
| 7,444,251 B2 | 10/2008 | Nikovski | |
| 7,466,703 B1 | 12/2008 | Arunachalam | |
| 7,472,422 B1 * | 12/2008 | Agbabian | H04L 41/06 726/25 |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,535,926 B1 | 5/2009 | Deshpande | |
| 7,542,471 B2 * | 6/2009 | Samuels | H04L 69/16 370/392 |
| 7,543,064 B2 | 6/2009 | Juncker | |
| 7,552,233 B2 * | 6/2009 | Raju | G06F 12/1483 709/238 |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,698,559 B1 | 4/2010 | Chaudhury | |
| 7,711,684 B2 | 5/2010 | Sundaresan | |
| 7,747,749 B1 | 6/2010 | Aamodt | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,814,425 B1 | 10/2010 | O'Shaugnessy | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 * | 7/2012 | Takeda | H04L 61/2564 709/223 |
| 8,225,057 B1 * | 7/2012 | Zheng | G06F 11/1458 711/114 |
| 8,239,331 B2 | 8/2012 | Shanmugavelayutham | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,375,420 B2 | 2/2013 | Farrell | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |

(56) References Cited

U.S. PATENT DOCUMENTS

| | | |
|---|---|---|
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,688,727 B1 | 4/2014 | Das |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,276,751 B2 * | 3/2016 | Mosko .................. H04L 9/3247 |
| 9,280,610 B2 | 3/2016 | Gruber |
| 9,380,326 B1 | 6/2016 | Corley |
| 9,400,852 B2 | 7/2016 | Kim |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |

(56) References Cited

U.S. PATENT DOCUMENTS

| | | |
|---|---|---|
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |

(56) References Cited

U.S. PATENT DOCUMENTS

| | | |
|---|---|---|
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1 | 6/2012 | Zhang |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0025948 A1* | 1/2014 | Bestler .......... H04L 9/0863 713/167 |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129690 A1 | 5/2014 | Jaisinghani |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |

(56) References Cited

U.S. PATENT DOCUMENTS

| | | |
|---|---|---|
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1 | 4/2015 | Scott |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1 | 1/2016 | Oran |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0149913 A1 | 5/2016 | Eriksson |
| 2016/0171184 A1 | 6/2016 | Solis |
| 2016/0173604 A1 | 6/2016 | Panigrahi |
| 2017/0005999 A1* | 1/2017 | Choyi ............... H04L 63/0435 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2562978 | 10/2014 |
| EP | 2928149 A1 | 10/2015 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2% 20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.

(56) References Cited

OTHER PUBLICATIONS

Microsoft Computer Dictionary, Fifth Edition, 2002, Microsoft Press, p. 23.
Mind- A Brief Introduction, John R. Searle, 2004, Oxford University Press, pp. 62-67.
J.J. Garcia-Luna-Aceves "Name-Based Content Routing in Information Centric Networks Using Distance Information", Proceedings of the 1st International Conference on Information-Centric Networking, INC '14, Sep. 24, 2014, pp. 7-16, *p. 10, left-hand column, first paragraph*.
Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd USENIX Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN); 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Ateniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

(56) References Cited

OTHER PUBLICATIONS

G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology -AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions On Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
International Search Report and Written Opinion in corresponding International Application No. PCT/US2017/025031, dated Jul. 3, 2017, 9 pgs.
DiBenedetto, et al., "ANDaNA: Anonymous Named Data Networking Application", XP055103467, Jan. 10, 2012, 18 pgs.

\* cited by examiner

METHOD AND SYSTEM FOR MUTATING AND CACHING CONTENT IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/337,026, entitled "SYSTEM FOR DISTRIBUTING NAMELESS OBJECTS USING SELF-CERTIFYING NAMES," by inventor Marc E. Mosko, filed 21 Jul. 2014 (hereinafter "U.S. patent application Ser. No. 14/337,026"); and U.S. patent application Ser. No. 15/081,776, entitled "SYSTEM AND METHOD FOR ROUTING PACKETS IN A CONTENT CENTRIC NETWORK USING ANONYMOUS DATAGRAMS," by inventor Jose J. Garcia-Luna-Aceves, filed 25 Mar. 2016 (hereinafter "U.S. patent application Ser. No. 15/081,776");

the disclosures of which are herein incorporated by reference in their entirety.

BACKGROUND

Field

This disclosure is generally related to distribution of digital content. More specifically, this disclosure is related to a method and system for mutating and caching content in a content centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN forwarder (e.g., an intermediate node or a router) can receive and forward interests and content objects based on their names. The forwarder can implement a local forwarding strategy based on three data structures: a pending interest table (PIT), which records all interests that the router has forwarded but not yet satisfied; a forwarding information base (FIB), which is a routing table that maps name prefixes to outgoing interfaces; and a content store (CS), which is a temporary cache of data packets received by the forwarder. Because content in a CCN is identified by its name, an interest with a name A will return a content object with the same name A. Thus, two consumers that send an interest with the name A will receive the same content object, i.e., the same actual bits. This may present a privacy issue because it reveals that the two consumers are using the same content object.

While a CCN brings many desired features to a network, some issues remain unsolved in preserving privacy for consumers that issue interests for the same content (i.e., based on the same name).

SUMMARY

One embodiment provides a system that facilitates mutating and caching content in a CCN. During operation, the system receives, by an intermediate node, a content object that indicates an encrypted payload, a signature, and a parameter for a group to which the content object belongs, wherein the content object includes a name that is a hierarchically structured variable length identifier which comprises contiguous name components ordered from a most general level to a most specific level. The system re-encrypts the content object based on the encrypted payload and the parameter to obtain a new encrypted payload and a new signature, wherein re-encrypting is not based on a private key or a public key associated with the encrypted payload. The system transmits the re-encrypted content object to a client computing device, thereby allowing the client computing device to decrypt the re-encrypted content object and verify the new signature.

In some embodiments, the system includes the new encrypted payload and the new signature in the re-encrypted content object.

In some embodiments, the encrypted payload and the signature indicated in the received content object are encrypted based on a public key of a content producing device, a private key of the client computing device, and two integers that are generated randomly based on the parameter.

In some embodiments, in response to determining that a copy of a content object with a same name as the content object name exists in a cache of the intermediate node, the system re-encrypts the copy of the content object.

In some embodiments, in response to determining that a copy of a content object with a same name as the content object name does not exist in a cache of the intermediate node, the system stores a copy of the received content object in the cache and transmits the received content object to the client computing device.

In some embodiments, the system receives an interest with a name that is a hierarchically structured variable length identifier which comprises contiguous name components ordered from a most general level to a most specific level. In response to determining that a copy of a content object with a same name as the interest name does exist in a cache of the intermediate node, the system re-encrypts the copy of the content object.

In some embodiments, the system transmits the re-encrypted content object to a previous-hop node based on an entry in a pending interest table, wherein the entry indicates an interest name that corresponds to the content object name, a list of incoming interfaces from which the interest is received, and a list of outgoing interfaces to which the interest is forwarded. The system removes from the entry a first interface from the list of incoming interfaces, wherein the first interface corresponds to the previous-hop node.

Another embodiment provides a system that facilitates mutating and caching content in a CCN. During operation, in response to generating an interest that includes a digest that is a hash of a responsive content object, wherein a name for the interest is a hierarchically structured variable length identifier which comprises contiguous name components ordered from a most general level to a most specific level, the system receives, by a client computing device, a content object with a same name as the interest name, wherein the content object indicates an encrypted payload, a signature, and a parameter for a group to which the content object belongs. In response to decrypting the encrypted payload based on a private key of the client computing device, the system verifies the signature indicated in the content object and determines that a hash of the decrypted payload matches the digest included in the interest, thereby allowing an intermediate node to re-encrypt the content object specifically for the client computing device based only on the encrypted payload and the parameter.

In some embodiments, the encrypted payload and the signature indicated in the received content object are encrypted based on a public key of a content producing device, a private key of the client computing device, and two integers that are generated randomly based on the parameter.

In some embodiments, verifying the signature indicated in the content object is based on the private key of the client computing device.

In some embodiments, in response to determining that the hash of the decrypted payload does not match the digest included in the interest, the system discards the content object.

In some embodiments, in response to determining that verifying the signature is unsuccessful, the system discards the content object.

In some embodiments, an entry in a pending interest table indicates an interest name that corresponds to the content object name and a list of outgoing interfaces to which the interest is forwarded. The system removes the entry from the pending interest table.

BRIEF DESCRIPTION OF THE FIGURES

In the figures, like reference numerals refer to the same figure elements.

DETAILED DESCRIPTION

Figure 1:
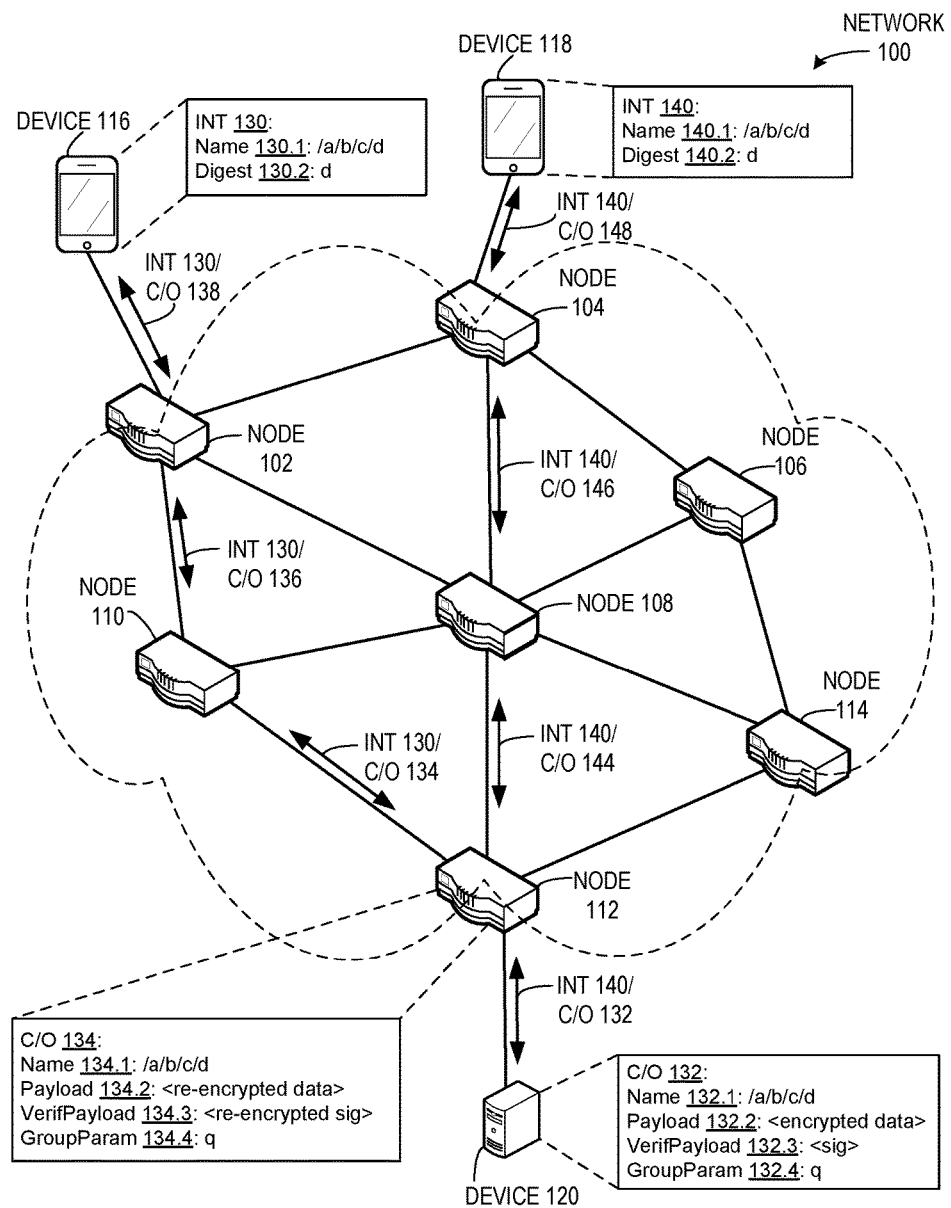
FIG. 1 illustrates an exemplary computing network that facilitates mutating and caching content in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of preserving privacy for consumers that issue interests for the same content by providing a system that allows an intermediate node to transparently mutate content (that is encrypted) without any knowledge of the public or private keys used to protect the content. In IP, protocols like SSL/TLS and IPSec may be used to encrypt all traffic between a client and a server (e.g., a consumer and a producer). This allows a message generated from the same producer and traversing two separate encrypted channels between two different consumers to have different bit representations. In CCN, where content is identified by its name, two consumers issuing an interest with the name A will receive the same content object back, i.e., the same actual bits, either from the producer or from an intermediate router (e.g., if the content exists in a local cache or CS of the router). Because this reveals that the two consumers are using the same content object, a privacy issue may arise in the form of a correlation attack.

Embodiments of the present invention address this privacy issue by allowing an intermediate node or router to mutate content (that is encrypted) without any knowledge of the public or private keys used to protect the content. An intermediate router can mutate the content opportunistically or based on a policy decision of the router, e.g., either upon a cache hit or before storing new content in the cache. An intermediate router can also mutate content for each incoming interface listed in a corresponding PIT entry. The goal of content mutation is to ensure that two interests for the same content do not return the same "bits." Content mutation may occur at every hop (e.g., at the producer and at each intermediate router), where all instances of the mutated content are different.

Mutated content is encrypted in some form, as the same message is represented as different instances. The present invention relies on universal re-encryption based on the ElGamal cryptosystem, which includes a key generation ("UKG") and an encryption ("UE") algorithm for the producer, a re-encryption ("URE") algorithm for an intermediate router, and a decryption ("UD") algorithm for the consumer. These algorithms are described in detail below.

In CCN and in examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object or "Content Object":

A single piece of named data, which is bound to a unique name. Content Objects are "persistent," which means that a Content Object can move around within a computing device, or across different computing devices, but does not change.

If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HS-VLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "Interest":

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

Face or "Face":

In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the terms "neighbor" and "interface" are interchangeable with the term "face," referring to an incoming or outgoing interface of an Interest.

The methods disclosed herein are not limited to CCN networks and are applicable to other architectures as well. A description of a CCN architecture is described in U.S. patent application Ser. No. 12/338,175 which is herein incorporated by reference.

Sample Algorithms for Universal Re-Encryption

Embodiments of the present invention use a universal re-encryption based on the ElGamal cryptosystem. Below is a set of exemplary algorithms used in this cryptosystem. Note that "q" is a suitably sized prime to generate "$Z_q$."

Key Generation ("UKG"):

Output$(PK,SK)=(y=g^x,x)$ for $x \in_U Z_q$   Equation (1)

Encryption ("UE"):

Input message m and public key y.

Output the ciphertext CT=$[(\alpha_0,\beta_0),(\alpha_1,\beta_1)]=[(my^{k_0}, g^{k_0}),(y^{k_1},g^{k_1})]$, where $r=(k_0,k_1) \in Z_q^2$   Equation (2)

Decryption ("UD"):

Input the ciphertext CT=$[(\alpha_0,\beta_0),(\alpha_1,\beta_1)]$.

Compute and output $m_0=\alpha_0/\beta_0^x$ if $m_1=\alpha_1/\beta_1^x$   Equation (3)

Re-Encryption ("URE"):

Input the ciphertext CT=$[(\alpha_0,\beta_0),(\alpha_1,\beta_1)]$.

Compute and output CT=$[(\alpha'_0,\beta'_0),(\alpha'_1,\beta'_1)]=$
$[(\alpha_0\alpha_1^{k'_0},\beta_0\beta_1^{k'_0}),(\alpha_1^{k'_1},\beta_1^{k'_1})]$ where $r'=(k'_0,k'_1) \in Z_q^r$   Equation (4)

The variables in Equations (1)-(4) are defined as follows: "y" refers to the public key of the content producing device; "x" refers to the private key of the client computing device; "g" refers to a tag or a generator variable used to compute y based on x; "m" refers to the unencrypted message which is an element of a group G of prime order q with generator g; "$m_0$" refers to the output of decrypting the encrypted payload; "$m_1$" refers to the output of verifying the encrypted signature; "CT" refers to the ciphertext, which is specific to each Equation; "$(\alpha_0,\beta_0)$" refers to the encrypted payload; "$(\alpha_1,\beta_1)$" refers to the encrypted signature; "r" refers to two randomly generated integers $(k_0,k_1) \in Z_q^2$ which are used to generate the ciphertext CT for Equation (2); "r'" refers to two randomly generated integers $(k'_0,k'_1) \in Z_q^r$ which are used to generate the ciphertext CT for Equation (4); and $[(\alpha'_0,\beta'_0),(\alpha'_1,\beta'_1)]$ refers to the re-encrypted payload and the re-encrypted signature.

Note that the input to the re-encryption ("URE") algorithm is only the ciphertext CT and the group parameter q. Different ElGamal ciphertexts may re-use the group parameter because the group parameter only determines the size of the ElGamal elements and does not affect the choice of elements within (i.e., all samples are done uniformly at random from $Z_q$).

High Level Overview of Method for Mutating and Caching Content

Let "C[n]" be the plaintext content object with the name "n," and let "I[n]" be an interest message for this content object. Because CCN uses exact match to generate content based on names, C[n] will always be the response to I[n]. A first consumer can issue to a producer an interest "I[n, d]" where "d" is a digest that is the hash of C[n]. Upon receipt of the interest, the producer can encrypt the payload of C[n] using the UE algorithm with the public key associated with the content object, generating "[em, sig]," where "em" indicates the encrypted form of the message and "sig" indicates the signature for the message. The producer can insert em as the payload of C[n] and sig as the Verification-Payload of C[n], creating "$C_{enc}[n]$." The producer can return the encrypted content object, $C_{enc}[n]$, downstream to the first consumer.

Upon receipt of the encrypted content object, $C_{enc}[n]$, an intermediate router can either forward the encrypted content object as is, or mutate the content object it before forwarding. The router can mutate the encrypted content object using the URE algorithm by modifying $C_{enc}[n]$. For example, the router can generate a new payload and a new VerificationPayload (e.g., "[em', sig']") and replace the previous versions in $C_{enc}[n]$, thus creating a mutated version of $C_{enc}[n]$ (e.g., $C_{mut}[n]$).

The first consumer can receive the mutated content object, $C_{mut}[n]$, decrypt the encrypted payload em' to obtain the plaintext payload "m," and verify the signature sig'. The first consumer can also verify that the hash of the plaintext payload m (e.g., d'=H(m)) matches the hash d provided with the original interest I[n, d]. The collision resistant properties of the hash function used to compute d makes it impossible for an attacker to forge a content object $C_{enc}[n]'$ such that its decrypted payload digest d' matches the expected payload digest d. Note that regardless of whether the first consumer receives $C_{enc}[n]$ or a mutated version such as $C_{mut}[n]$, the first consumer need only perform a single decryption based on the UD algorithm, which uses the private key of C, to obtain the decrypted payload (and digest for subsequent verification). The multiplicative properties involved in the UE and URE algorithms allow the use of the UD algorithm, which requires only one division operation to yield the original payload m.

If a second consumer issues the same interest I[n, d] that is forwarded along a path that shares at least one mutating intermediate router with the first consumer, the second consumer can receive a response that is a different mutated content object, e.g., that is not equal to $C_{mut}[n]$. However, the payload digest of both decrypted results will be the same. Thus, the system allows two different consumers that send interests for the same content (e.g., with the same name) to receive different responsive re-encrypted content objects with the same decrypted payload. The re-encryption (e.g., the URE algorithm) performed by one or more intermediate nodes requires only the ciphertext and a group parameter, and does not require any private or public keys of the content producing device or the client computing device (or any keys associated with the encrypted payload).

Because the URE algorithm is based essentially on multiplication, performing the re-encryption is not a computationally complex process. Hence, a system in which all routers perform re-encryption does not expend a significant amount of computation or processing time to implement the method and system described herein. Furthermore, despite the number of times that content is mutated, a consumer need only perform a single decryption based on the UD algorithm.

Exemplary Computing Network and Mutating Short Messages

FIG. 1 illustrates an exemplary computing network that facilitates mutating and caching content in a content centric network, in accordance with an embodiment of the present invention. A network 100 can include consumer or client computing devices 116 and 118, a producer or content producing device 120, and a router, intermediate node, or other forwarding device at nodes 102, 104, 106, 108, 110, 112, and 114. Client computing devices 116 and 118 can include a smartphone, a tablet computer, and/or a personal computing device (e.g., a laptop). A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network. Each of devices 116, 118, and 120, as well as routers 102-114 can maintain a forwarding information base (FIB) and a pending interest table (PIT).

During operation, a first consumer or client computing device 116 can generate an interest 130 with a name 130.1 of "/a/b/c/d" and a digest 130.2 of "d" which is a content object hash restriction or a hash of a responsive content object with a same name as interest name 130.1. Interest 130 can travel through network 100 via nodes 102, 110, and 112 before reaching producer or content producing device 120. Device 120 can generate a responsive content object 132 with a name 132.1 of "/a/b/c/d," a payload 132.2 that is encrypted (e.g., "<encrypted data>"), a VerificationPayload 132.3 field that indicates the signature (e.g., "<sig>"), and a GroupParameter 132.4 field that indicates the ElGamal group parameter with a value of "q." Assume that the size of payload 132.2 is less than the size of a group element, and that content object 134 belongs to a group which uses "q" as group parameter 132.4. For example, device 120 can encrypt payload 132.2 using the UE algorithm, which outputs the following ciphertext: $CT=[(\alpha_0,\beta_0),(\alpha_1,\beta_1)]=[(my^{k_0},g^{k_0}),(y^{k_1},g^{k_1})]$, and insert $(\alpha_0,\beta_0)$ as payload 132.2 and insert $(\alpha_1,\beta_1)$ as VerificationPayload 132.3. Device 120 can subsequently return this encrypted content object 132 downstream back to device 116.

Upon receipt of encrypted content object 132, intermediate node or router 112 can determine whether to forward content object 132 as is (e.g., without mutating it), or to mutate content object 132 before forwarding it. Router 112 can determine to mutate a received content object upon: receiving the content object; determining a cache hit for the content object in its CS; or based on any other policy or strategy implemented by router 112. To mutate content object 132, router 112 can re-encrypt content object 132 by using the URE algorithm, which takes as input the ciphertext $CT=[(\alpha_0,\beta_0),(\alpha_1,\beta_1)]$, and computes and outputs a new $CT=[(\alpha'_0,\beta'_0),(\alpha'_1,\beta'_1)]=[(\alpha_0\alpha_1^{k'_0},\beta_0\beta_1^{k'_0}),(\alpha_1^{k'_1},\beta_1^{k'_1})]$.

Router 112 can replace the previous payload and previous signature with the new payload and new signature. Router 112 can insert $(\alpha'_0,\beta'_0)$ as payload 134.2 and insert $(\alpha'_1,\beta'_1)$ as VerificationPayload 134.3.

Note that content object 134 is represented as a different content object from content object 132 for the sake of illustration. Payload 134.2 includes the "<re-encrypted data>" and VerifPayload 134.3 includes the "<re-encrypted sig>" as described above. Router 112 can also store or cache the mutated content object 134 in its local cache or content store (CS). Additionally, content object 134 is merely an example of how a router or intermediate node can mutate or re-encrypt a content object. Each of nodes 110, 102, 108, and 104 can also determine whether to mutate a received content object to create content objects 136, 138, 146, and 148. Furthermore, an intermediate node may mutate a content object forwarded via each incoming interface to a corresponding previous-hop node. For example, router 112 may mutate content object 132 into content object 134 to be sent or forwarded to previous-hop node 110 per the corresponding interface listed in the PIT of router 112, and node 112 may also mutate content object 132 into content object 144 to be sent to previous-hop node 108 per that corresponding interface listed in its PIT.

Subsequently, client computing device 116 can receive a content object 138 that is similar to mutated content object 134 as described above. Device 116 can decrypt the encrypted payload 134.2 to obtain the plaintext payload, and can verify the signature in VerificationPayload 134.3. For example, device 116 can decrypt content object 134 by using the UD algorithm, which takes as input the ciphertext $CT=[(\alpha_0,\beta_0),(\alpha_1,\beta_1)]$, and computes and outputs $m_0=\alpha_0/\beta_0^x$ where $m_0$ is the plaintext payload. Device 116 can further verify the integrity of $m_0$ by confirming that $m_1=\alpha_1/\beta_1^x$. Device 116 can subsequently verify that the hash of the plaintext payload $m_0$ of content object 134 (or 138) matches digest 130.2 provided in original interest 130. As mentioned above, the collision resistant properties of the hash function used to compute digest 130.2 makes it impossible for an attacker to forge a content object with a decrypted payload that matches the expected payload digest 130.2.

If a second client computing device (e.g., device 118) issues a same interest that is forwarded along a path that shares at least one mutating intermediate router with the first client computing device 116, device 118 can receive a responsive content object that is a different mutated content object. During operation, device 118 can generate an interest 140 with a name 140.1 of "/a/b/c/d" and a digest 140.2 of "d" which is a content object hash restriction or a hash of a responsive content object with a same name as interest name 140.1. Note that interest 140 is the same as interest 130, in that they share a same name and a same digest. Interest 140 can travel through network 100 via nodes 104, 108, and 112 before reaching producer or content producing device 120. As described in response to interest 130, device 120 can generate a responsive content object 132 with a name 132.1 of "/a/b/c/d," a payload 132.2 that is encrypted (e.g., "<encrypted data>"), a VerificationPayload 132.3 field that indicates the signature (e.g., "<sig>"), and a GroupParameter 132.4 field that indicates the ElGamal group parameter with a value of "q." Device 120 can subsequently return this encrypted content object 132 downstream back to device 118.

Upon receipt of encrypted content object 132, intermediate node or router 112 can determine whether to forward content object 132 as is (e.g., without mutating it), or to mutate content object 132 before forwarding it. For example, router 112 may determine a hit in its CS for a content object with the name "/a/b/c/d," such as previously stored content object 134. Router 112 can determine to mutate content object 132 based on this cache hit, or based on any other policy of router 112. Router 112 can re-encrypt content object 132 by using the URE algorithm, which replaces the previous payload and previous signature with the new payload and new signature, to "create" a mutated content object 144. Note that content object 144 is represented as a different content object from content object 132 for the sake of illustration. As described above, mutated content object 144 include similar fields as mutated content object 134 (e.g., a payload 144.2 includes the "<re-encrypted data>" and a VerificationPayload 144.3 includes the "<re-encrypted sig>" (not shown)).

Assuming that mutation occurs at each of intermediate routers 108 and 104, device 118 can subsequently receive a content object 148 that is similar to mutated content objects 134 and 144. However, while each mutated content object may contain the same fields, some fields will indicate a same value, and some fields will indicate a different value. For example, for interest 130 and content objects 132, 134, 136, and 138, these packets include a same value for the name and group parameter fields, but a different value for the payload and VerificationPayload fields. Similarly, for interest 140 and content objects 132, 144, 146, and 148, these packets include a same value for the name and group parameter fields, but a different value for the payload and VerificationPayload fields.

Thus, content objects received by two different consumers in response to an interest by the same name are different, and can only be decrypted based on the private key of the consumer. However, the decrypted payload of both content objects will be the same, just as a verification yields that the hash of the decrypted payload is the same as the digest included in the initial interests.

Mutating Long Messages; Routing

The above description assumes that the payload size of a content object is less than the size of a group element. Based on the ElGamal encryption scheme, if a message is too large to be encoded in a single group element, the message can be processed in blocks. This is similar to how the Merkle-Damgard hash function construction handles inputs of arbitrary length. Note, however, that using the same value of r and r' for the different blocks of the same message may enable an attacker to algebraically recover the original plaintext. Thus, the same value of r and r' should not be used for the different blocks of the same message.

On routing, an intermediate router can use the name of the interest or content object to determine how to forward an interest or content object packet. An intermediate router can also use anonymous datagrams to establish a path to a consumer, as described in U.S. patent application Ser. No. 15/081,776. An intermediate router can also receive a nameless content object created by a content producer, where the nameless content objects are addressed by a content object hash self-certifying name, as described in U.S. patent application Ser. No. 14/337,026.

Client Computing Device Facilitates Mutating and Caching Content

Figure 2:
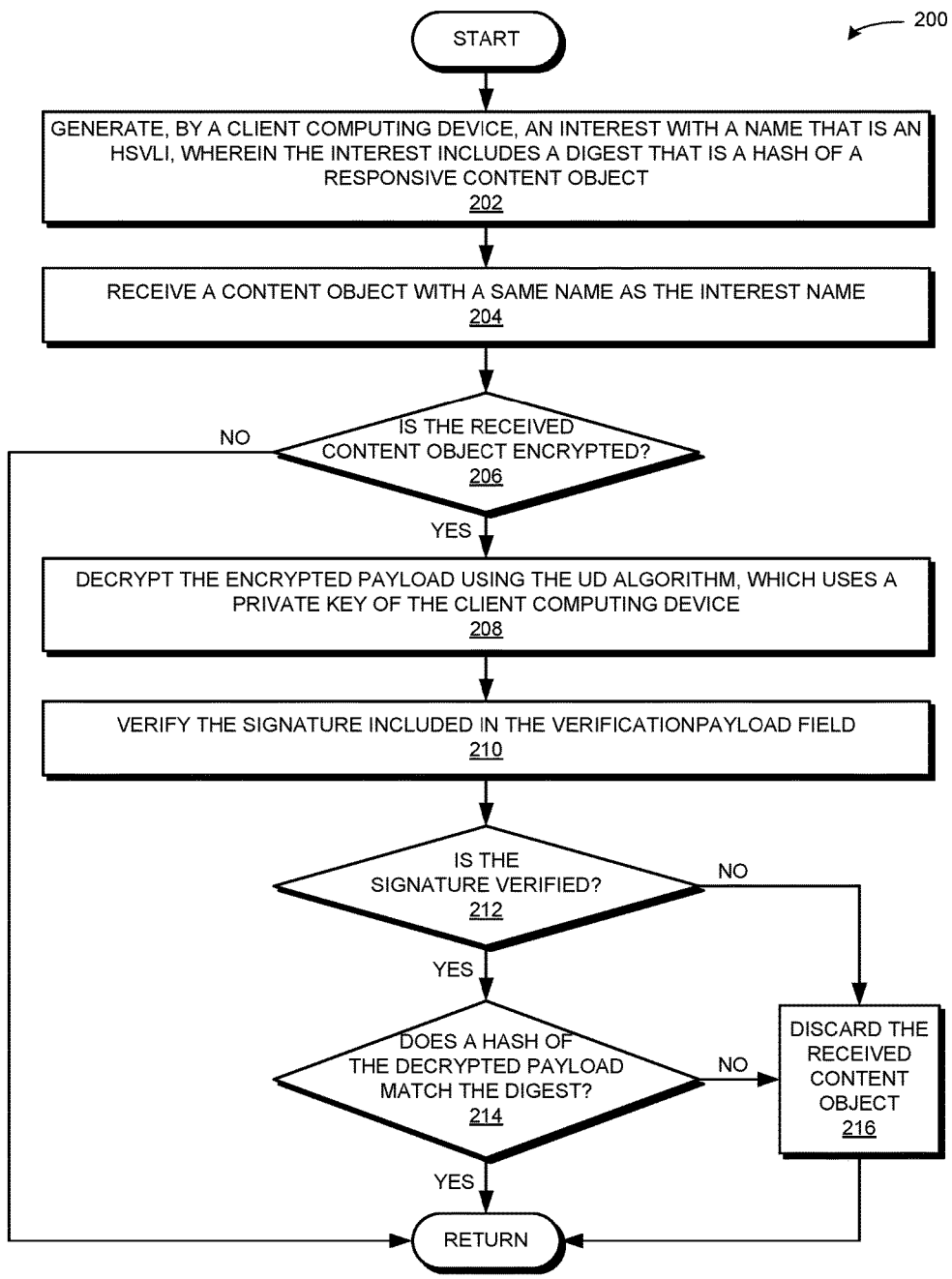
FIG. 2 presents a flow chart illustrating a method performed by a client computing device for facilitating mutating and caching content in a content centric network, in accordance with an embodiment of the present invention.

FIG. 2 presents a flow chart 200 illustrating a method performed by a client computing device for facilitating mutating and caching content in a content centric network, in accordance with an embodiment of the present invention. During operation, the system generates, by a client computing device, an interest with a name that is an HSVLI, wherein the interest includes a digest that is a hash of a responsive content object (operation 202). The system receives a content object with a name that is the same as the interest name (operation 204). The system determines whether the received content object is encrypted (decision 206). If it is not, the operation returns. The received content object may indicate an encrypted payload and a VerificationPayload field that includes a signature. If the received content object is encrypted, the system decrypts the encrypted payload using the UD algorithm, which uses a private key of the client computing device (operation 208). The system verifies the signature in the VerificationPayload field (operation 210). If the signature is not verified (decision 212), the system discards the received content object (operation 216). If the signature is verified (decision 212), the system determines whether a hash of the decrypted payload matches the digest included in the interest (decision 214). If it does not match, the system discards the received content object (operation 216). If it does match, the system can clear the corresponding PIT entry (not shown) and the operation returns.

Intermediate Node or Router Facilitates Mutating and Caching Content

Figure 3:
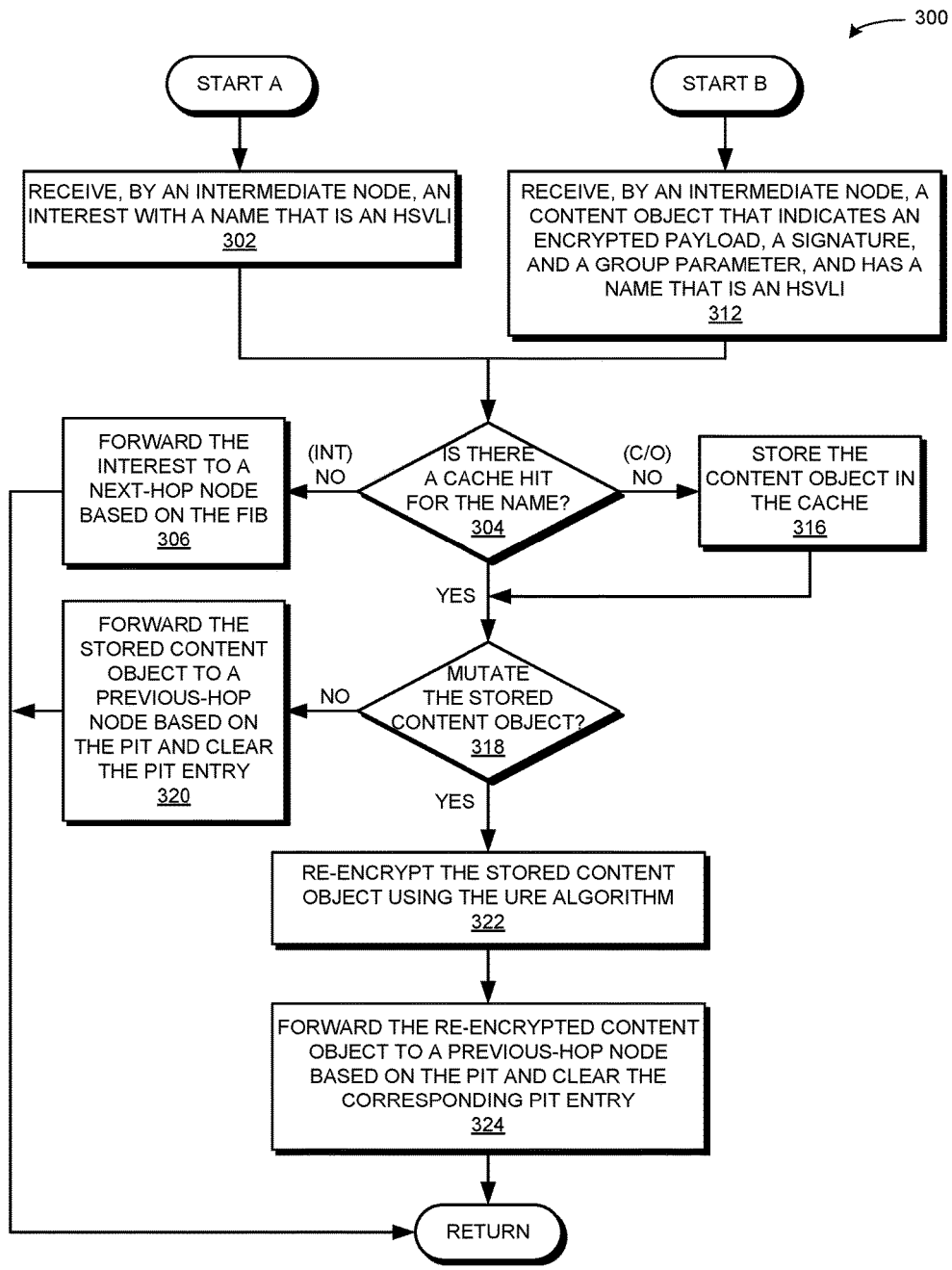
FIG. 3 presents a flow chart illustrating a method performed by an intermediate router or a forwarding device for facilitating mutating and caching content in a content centric network, in accordance with an embodiment of the present invention.

FIG. 3 presents a flow chart 300 illustrating a method performed by an intermediate router or a forwarding device for facilitating mutating and caching content in a content centric network, in accordance with an embodiment of the present invention. Note that flow chart 300 can start at either of labels "Start A" or "Start B," as described below. During operation, the system receives, by an intermediate node, an interest with a name that is an HSVLI (operation 302, under the Start A label). Alternatively, the system can receive a content object that indicates an encrypted payload, a signature, and a group parameter, and has a name that is an HSVLI (operation 312, under the Start B label). The system can subsequently determine whether a cache hit exists for the name (either the interest name or the content object name) (decision 304). In other words, the system determines whether a local cache or content store (CS) of the intermediate node includes a content object by the interest name or the content object name. If there is not a cache hit for the interest name, the system forwards the interest to a next-hop node based on information in the forwarding information base (FIB) (operation 306), and also logs the corresponding outgoing interface in the PIT. If there is not a cache hit for the content object name, the system stores the content object in the cache (operation 316), and the operation continues as described below for operation 318.

If there is a cache hit for the (interest or content object) name (i.e., the CS does include a stored content object with a matching name), the system determines whether to mutate the stored content object (decision 318). This determination can be based on a policy decision or other strategy scheme of the intermediate router or forwarding device. For example, the intermediate router may mutate a stored content object based on a number of incoming interfaces listed in its PIT for a corresponding interest, or the intermediate router may mutate all content objects sent to different incoming interfaces.

If the system determines not to mutate the stored content object, the system forwards the stored content object to a previous-hop node based on the PIT, and also clears the PIT entry (operation 320). In the case of multiple incoming interfaces listed in the PIT entry, instead of clearing the PIT entry, the system can remove the incoming interface associated with the previous-hop node. If the system determines to mutate the stored content object, the system re-encrypts the stored content object using the URE algorithm (operation 322). The system forwards the re-encrypted content object to a previous-hop node based on the PIT, and also clears the corresponding PIT entry (or removes from the PIT entry the incoming interface associated with the previous-hop node) (operation 324).

Content Producing Device Facilitates Mutating and Caching Content

Figure 4:
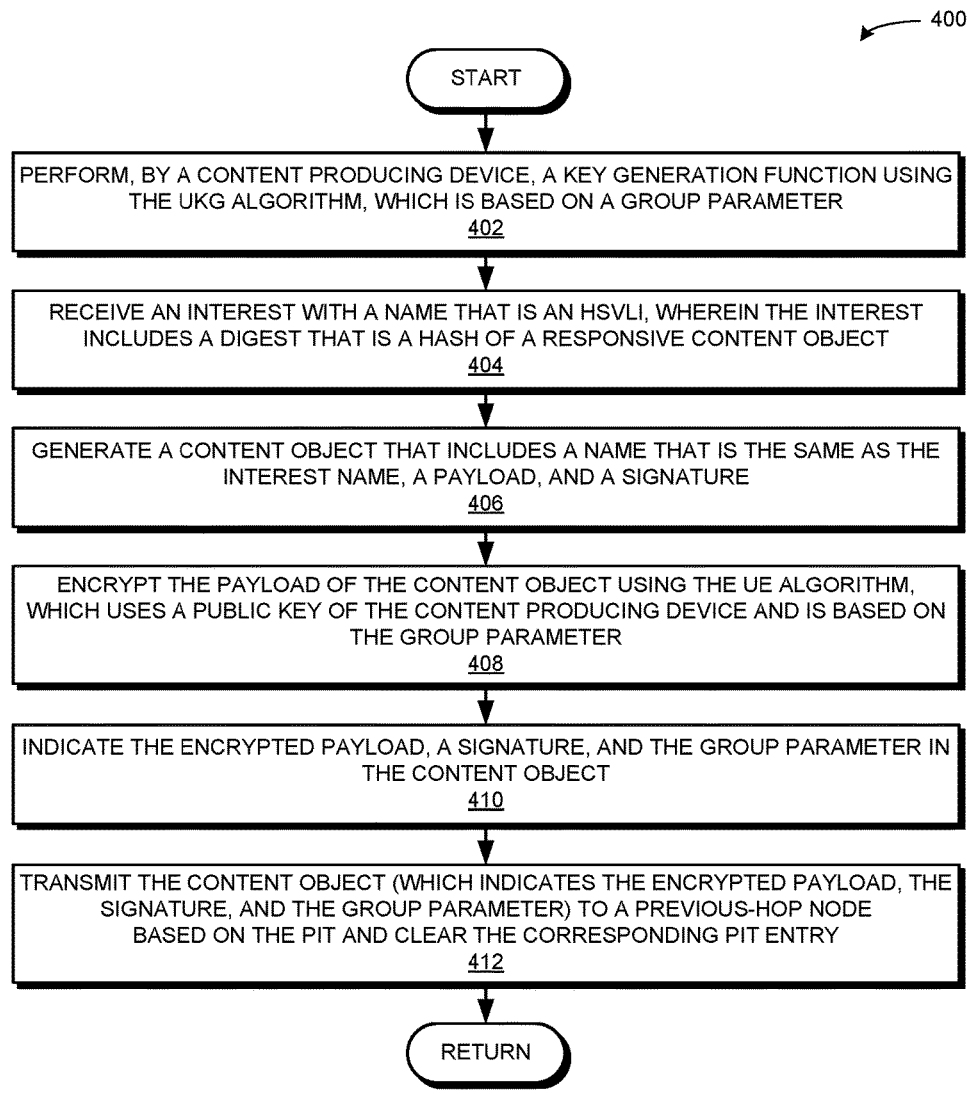
FIG. 4 presents a flow chart illustrating a method performed by a content producing device for facilitating mutating and caching content in a content centric network, in accordance with an embodiment of the present invention.

FIG. 4 presents a flow chart 400 illustrating a method performed by a content producing device for facilitating mutating and caching content in a content centric network, in accordance with an embodiment of the present invention. During operation, the system, by a content producing device, performs a key generation function using the UKG algorithm, which is based on a group parameter (operation 402). The key generation function can be performed offline or in advance of the remainder of the communication between the content producing device, the client computing device, and any intermediate routers. For example, the content producing device and the client computing device may exchange the necessary and relevant key information based on the Diffie-Hellman key exchange protocol in advance of operation 404.

Next, the system receives an interest with a name that is an HSVLI, wherein the interest includes a digest that is a hash of a responsive content object (operation 404). The system generates a content object that includes the name, a payload, and a signature (operation 406). The system encrypts the payload of the content object using the UE algorithm, which uses a public key of the content producing device and is based on the group parameter (operation 408). The system indicates the encrypted payload, the signature, and the group parameter in the content object (operation 410). Subsequently, the system transmits the content object (which indicates the encrypted payload, the signature, and the group parameter) to a previous-hop node based on the PIT and clears the corresponding PIT entry (or removes from the PIT entry the incoming interface associated with the previous-hop node) (operation 412).

Exemplary Computer and Communication System

Figure 5:
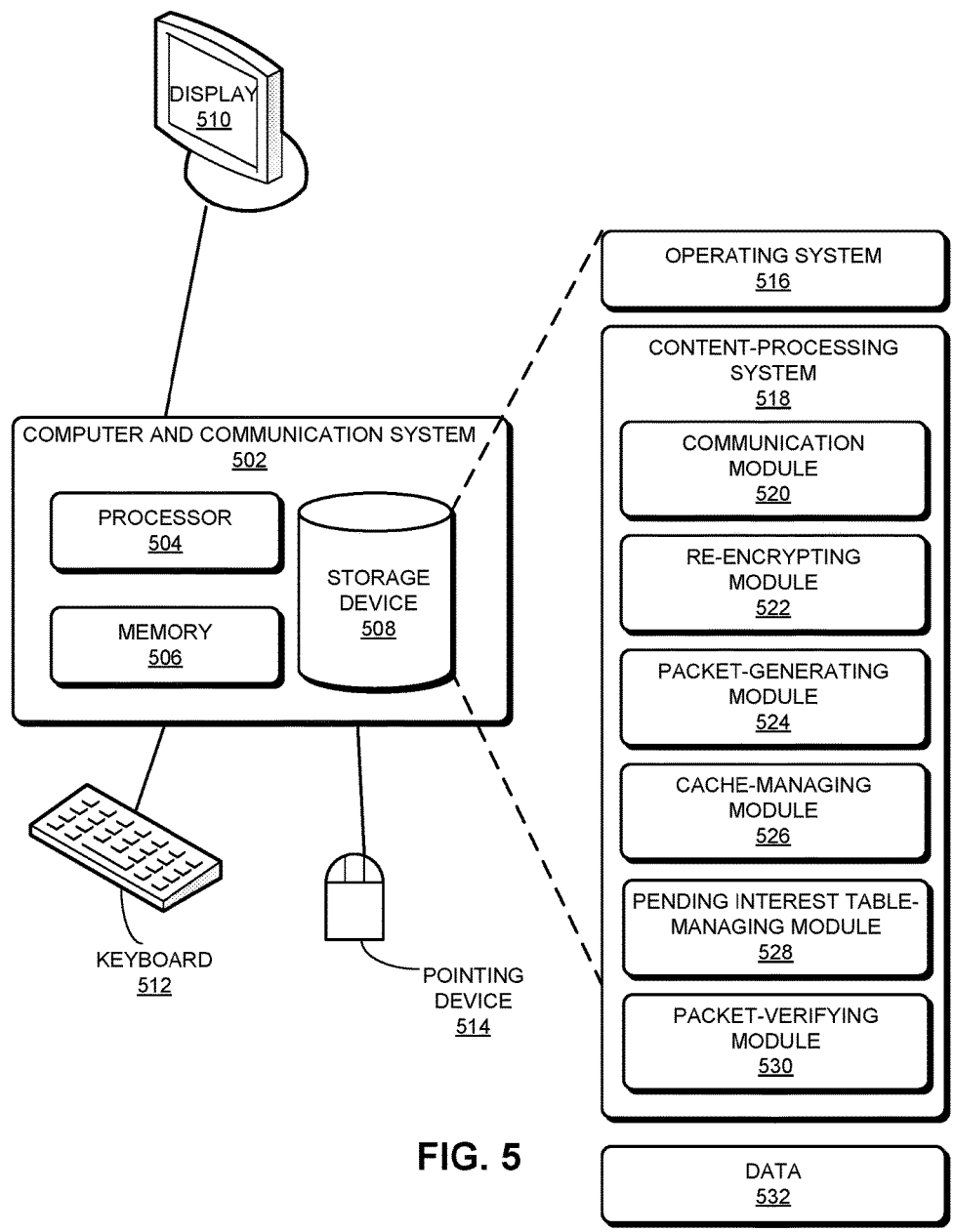
FIG. 5 illustrates an exemplary computer and communication system that facilitates mutating and caching content in a content centric network, in accordance with an embodiment of the present invention.

FIG. 5 illustrates an exemplary computer and communication system 502 that facilitates mutating and caching content in a content centric network, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 532.

Content-processing system 518 can include instructions, which when executed by computer and communication system 502, can cause computer and communication system 502 to perform methods and/or processes described in this disclosure. Specifically, content-processing system 518 may include instructions for sending and/or receiving data packets to/from other network nodes across a computer network, such as a content centric network (communication module 520). A data packet can include an interest packet or a content object packet with a name which is an HSVLI that includes contiguous name components ordered from a most general level to a most specific level.

Specifically, content-processing system 518 may include instructions for receiving, by an intermediate node, a content object that indicates an encrypted payload, a signature, and a parameter for a group to which the content object belongs, wherein the content object includes a name that is an HSVLI (communication module 520). Content-processing system 518 can include instructions for re-encrypting the content object based on the encrypted payload and the parameter to obtain a new encrypted payload and a new signature, wherein re-encrypting is not based on a private key or a public key associated with the encrypted payload (re-encrypting module 522). Content-processing system 518 can include instructions for transmitting the re-encrypted content object to a client computing device (communication module 520).

Content-processing system 518 can further include instructions for including the new encrypted payload and the new signature in the re-encrypted content object (re-encrypting module 522). Content-processing system 518 can include instructions for, in response to determining that a copy of a content object with a same name as the content object name exists in a cache of the intermediate node (cache-managing module 526), re-encrypting the copy of the content object (re-encrypting module 522). Content-processing system 518 can also include instructions for, in response to determining that a copy of a content object with a same name as the content object name does not exist in a cache of the intermediate node (cache-managing module 526), storing a copy of the received content object in the cache (cache-managing module 526) and transmitting the received content object to the client computing device (communication module 520).

Content-processing system 518 can additionally include instructions for receiving an interest with a name that is an HSVLI (communication module 520). Content-processing system 518 can include instructions for, in response to determining that a copy of a content object with a same name as the interest name does exist in a cache of the intermediate node (cache-managing module 526), re-encrypting the copy of the content object (re-encrypting module 522). Content-processing system 518 can include instructions for transmitting the re-encrypted content object to a previous-hop node based on an entry in a pending interest table (communication module 520). Content-processing system 518 can also include instructions for removing from the PIT entry a first interface from a list of incoming interfaces, wherein the first interface corresponds to the previous-hop node (pending interest table-managing module 528).

Furthermore, content-processing system 518 can include instructions for, in response to generating an interest that includes a digest that is a hash of a responsive content object, wherein a name for the interest is an HSVLI (packet-generating module 524), receiving, by a client computing device, a content object with a same name as the interest name, wherein the content object indicates an encrypted payload, a signature, and a parameter for a group to which the content object belongs (communication module 520). Content-processing system 518 can also include instructions for, in response to decrypting the encrypted payload based on a private key of the client computing device, verifying the signature indicated in the content object and determining that a hash of the decrypted payload matches the digest included in the interest (packet-verifying module 530).

Content-processing system 518 can also include instructions for verifying the signature indicated in the content object based on the private key of the client computing device (packet-verifying module 530). Content-processing system 518 can also include instructions for, in response to determining that the hash of the decrypted payload does not match the digest included in the interest, discarding the content object (packet-verifying module 530). Content-processing system 518 can also include instructions for, in response to determining that verifying the signature is unsuccessful, discarding the content object (packet-verifying module 530). Content-processing system 518 can also include instructions for removing an entry from the PIT that indicates an interest name that corresponds to the content object name (pending interest table-managing module 528).

Data 532 can include any data that is required as input or that is generated as output by the methods and/or processes described in this disclosure. Specifically, data 532 can store at least: a content object; an interest; an encrypted or re-encrypted payload; an encrypted or re-encrypted signature; a group parameter; a prime or prime number; a generator; an integer that is randomly generated based on the parameter; a name for a content object or an interest that is an HSVLI which comprises contiguous name components ordered from a most general level to a most specific level; a forwarding information base (FIB); an entry in the FIB; a pending interest table (PIT); an entry in the PIT; a PIT entry that indicates an interest name, a list of incoming interfaces from which an interest is received, and a list of outgoing interfaces to which the interest is forwarded; an interface that corresponds to a previous-hop or a next-hop node; a private key; a public key; a local cache or a content store (CS); a copy of a content object stored in the local cache or CS; a digest that is a hash of a responsive content object; a hash of a decrypted payload; and an indicator of a result of a signature verification.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, the system comprising an intermediate node in a computer network, the intermediate node including:
   a processor;
   a storage device coupled to the processor and storing instructions that when executed by the processor cause the processor to perform:
   receiving, by the intermediate node, a content object that indicates an encrypted payload, a signature, and a parameter for a group to which the content object belongs, wherein the content object includes a name that is a hierarchically structured variable length identifier which comprises contiguous name components ordered from a most general level to a most specific level;
   re-encrypting the encrypted payload based on the parameter to obtain a new encrypted payload and generating a new signature for a re-encrypted content object, wherein re-encrypting is not based on a private key or a public key associated with the encrypted payload; and
   transmitting the re-encrypted content object to a client computing device, thereby allowing the client computing device to decrypt the re-encrypted content object, verify the new signature, and avoid a correlation attack, wherein transmitting the re-encrypted content object to the client computing device further includes:
   transmitting the re-encrypted content object to a previous-hop node based on an entry in a pending interest table, wherein the entry indicates an interest name that corresponds to the content object name, a list of incoming interfaces at which the interest is received, and a list of outgoing interfaces from which the interest is forwarded; and removing from the entry a first interface from the list of incoming interfaces, wherein the first interface corresponds to the previous-hop node.

2. The computer system of claim 1, wherein the processor is further configured to perform:
including the new encrypted payload and the new signature in the re-encrypted content object.

3. The computer system of claim 1, wherein the encrypted payload and the signature indicated in the received content object are encrypted based on a public key of a content producing device, a private key of the client computing device, and two integers that are generated randomly based on the parameter.

4. The computer system of claim 1, wherein re-encrypting the encrypted payload further comprises:
in response to determining that a copy of a content object with a same name as the content object name exists in a cache of the intermediate node, re-encrypting the encrypted payload.

5. The computer system of claim 1, wherein the processor is further configured to perform:
in response to determining that a copy of a content object with a same name as the content object name does not exist in a cache of the intermediate node:
storing a copy of the received content object in the cache; and
transmitting the received content object to the client computing device.

6. The computer system of claim 1, wherein the processor is further configured to perform:
receiving an interest with an interest name that is a hierarchically structured variable length identifier which comprises contiguous name components ordered from a most general level to a most specific level; and
wherein re-encrypting the encrypted payload further comprises:
in response to determining that a copy of a content object with a same name as the interest name does exist in a cache of the intermediate node, re-encrypting the encrypted payload.

7. The computer system of claim 1, wherein the processor is configured to re-encrypt the encrypted payload using a re-encryption algorithm based on multiplication.

8. A computer-implemented method, comprising:
receiving, by an intermediate node in a computer network, a content object that indicates an encrypted payload, a signature, and a parameter for a group to which the content object belongs, wherein the content object includes a name that is a hierarchically structured variable length identifier which comprises contiguous name components ordered from a most general level to a most specific level;
re-encrypting the encrypted payload based on the parameter to obtain a new encrypted payload and generating a new signature for a re-encrypted content object, wherein re-encrypting is not based on a private key or a public key associated with the encrypted payload; and
transmitting the re-encrypted content object to a client computing device, thereby allowing the client computing device to decrypt the re-encrypted content object, verify the new signature, and avoid a correlation attack, wherein transmitting the re-encrypted content object to the client computing device further includes:
transmitting the re-encrypted content object to a previous-hop node based on an entry in a pending interest table, wherein the entry indicates an interest name that corresponds to the content object name, a list of incoming interfaces at which the interest is received, and a list of outgoing interfaces from which the interest is forwarded; and
removing from the entry a first interface from the list of incoming interfaces, wherein the first interface corresponds to the previous-hop node.

9. The method of claim 8, further comprising:
including the new encrypted payload and the new signature in the re-encrypted content object.

10. The method of claim 8, wherein the encrypted payload and the signature indicated in the received content object are encrypted based on apublic key of a content producing device, a private key of the client computing device, and two integers that are generated randomly based on the parameter.

11. The method of claim 8, wherein re-encrypting the encrypted payload further comprises:
in response to determining that a copy of a content object with a same name as the content object name exists in a cache of the intermediate node, re-encrypting the encrypted payload.

12. The method of claim 8, further comprising:
in response to determining that a copy of a content object with a same name as the content object name does not exist in a cache of the intermediate node:
storing a copy object in the cache; and
transmitting the received content object to the client computing device.

13. The method of claim 8, further comprising:
receiving an interest with an interest name that is a hierarchically structured variable length identifier which comprises contiguous name components ordered from a most general level to a most specific level; and
wherein re-encrypting the encrypted payload further comprises:
in response to determining that a copy of a content object with a same name as the interest name does exist in a cache of the intermediate node, re-encrypting the encrypted payload.

14. The method of claim 8, wherein re-encrypting the encrypted payload further comprises: re-encrypting the encrypted payload using a re-encryption algorithm based on multiplication.

15. A non-transitory computer-readable storage medium encoded with software comprising computer executable instructions which, when executed by a processor of an intermediate node in a computer network, cause the processor to:
receive a content object that indicates an encrypted payload, a signature, and a parameter for a group to which the content object belongs, wherein the content object includes a name that is a hierarchically structured variable length identifier which comprises contiguous name components ordered from a most general level to a most specific level;
re-encrypt the encrypted payload based on the parameter to obtain a new encrypted payload and generate a new signature for a re-encrypted content object, wherein re-encrypting is not based on a private key or a public key associated with the encrypted payload; and
transmit the re-encrypted content object to a client computing device, thereby allowing the client computing device to decrypt the re-encrypted content object, verify the new signature, and avoid a correlation attack, wherein the instructions cause the processor to transmit the re-encrypted content object to the client computing device by:

transmitting the re-encrypted content object to a previous-hop node based on an entry in a pending interest table, wherein the entry indicates an interest name that corresponds to the content object name, a list of incoming interfaces at which the interest is received, and a list of outgoing interfaces from which the interest is forwarded; and removing from the entry a first interface from the list of incoming interfaces, wherein the first interface corresponds to the previous-hop node.

16. The non-transitory computer-readable storage medium of claim 15, wherein the encrypted payload and the signature indicated in the received content object are encrypted based on a public key of a content producing device, a private key of the client computing device, and two integers that are generated randomly based on the parameter.

17. The non-transitory computer-readable storage medium of claim 15, wherein the instructions cause the processor to re-encrypt the encrypted payload by:

in response to determining that a copy of a content object with a same name as the content object name exists in a cache of the intermediate node, re-encrypting the encrypted payload.

18. The non-transitory computer-readable storage medium of claim 15, wherein the instructions further cause the processor to:

in response to determining that a copy of a content object with a same name as the content object name does not exist in a cache of the intermediate node:
store a copy of the content object in the cache; and
transmit the received content object to the client computing device.

19. The non-transitory computer-readable storage medium of claim 15, wherein the instructions further cause the processor to:

receive an interest with an interest name that is a hierarchically structured variable length identifier which comprises contiguous name components ordered from a most general level to a most specific level; and in response to determining that a copy of a content object with a same name as the interest name does exist in a cache of the intermediate node, re-encrypt the encrypted payload.

20. The non-transitory computer-readable storage medium of claim 15, wherein the instructions cause the processor to re-encrypt the encrypted payload using a re-encryption algorithm based on multiplication.

* * * * *